G. E. SELLERS.
Cane-Stripper.

No. 46,031. Patented Jan. 24, 1865.

Witnesses:
F. H. Sellers
A. L. Dennis

Inventor:
Geo. Escol Sellers

UNITED STATES PATENT OFFICE.

GEO. ESCOL SELLERS, OF SELLERS' LANDING, ILLINOIS.

CANE-STRIPPER.

Specification forming part of Letters Patent No. 46,031, dated January 24, 1865.

*To all whom it may concern:*

Be it known that I, GEORGE ESCOL SELLERS, of Sellers' Landing, Harden county, in the State of Illinois, have invented certain Improvements in the Mode of Stripping Cane (*Arundinaria macrosperma*) or Reeds of their Branches and Leaves, of which the following is a specification.

The object of my invention is to strip the branches and leaves, or the leaves alone, from the stems of the cane or reeds by mechanical means in a cheaper and better manner than has heretofore been done, and to prepare them for bundling and shipping or for use in the arts.

The nature of my invention consists in passing the cane between revolving arms, slats, teeth, or blades in such a manner that the arms, slats, teeth, or blades strike rapid and successive blows against the branches or spines and snap them off from the stem or culm.

In order to render my invention clear to any practical mechanic, and to enable him to put it into practice, I will describe the mode in which I employ it, referring to the annexed drawings, making part of this specification.

Figure 1:
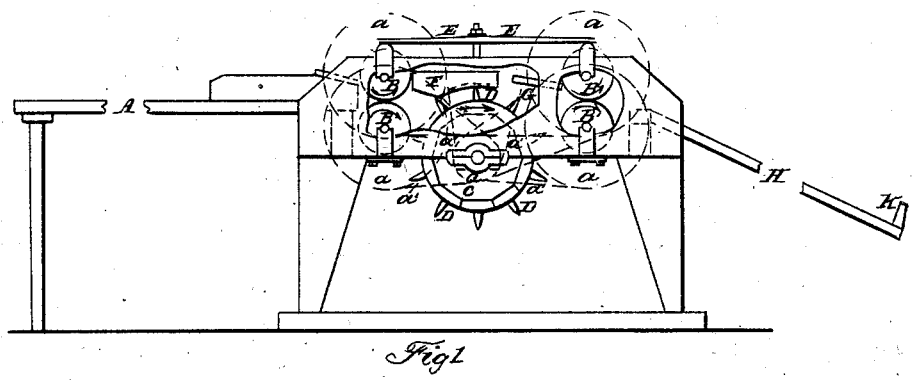
Figure 3:
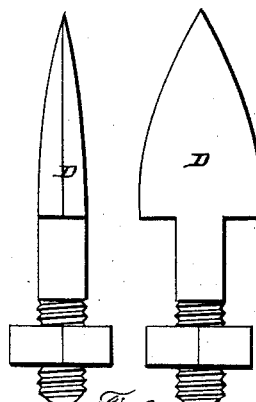
Figure 2:
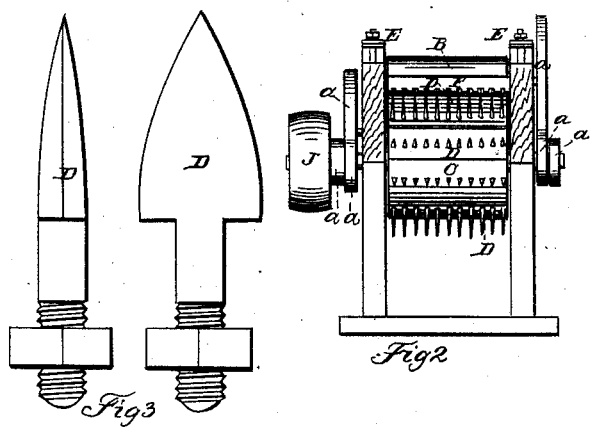

Figure 1 is a side elevation, part in section. Fig. 2 is a transverse section, showing stripping-cylinder and shield; Fig. 3, side and edge views of blades or teeth, full size.

Similar letters having reference to similar parts, A is the table from which the cane or reeds are fed into the machine.

B B and B' B' are feed-rolls. C is a stripping-cylinder armed with blades or teeth D D D. The feed-rolls and stripping-cylinder are made to rotate in the direction indicated by the arrows. The feed-rolls are pressed together by the springs E E.

F is a guide to direct the cane between the blades, and also a shield to prevent its rising above the points of the blades.

G is a guide to direct the cane between the feed-rolls B' B'.

H is an inclined table, on which the cane is received after it has passed through the machine. This table has a foot-board or stop, K, against which the butts of the cane stop in a condition to be bundled.

J is the driving-pulley. *a a* pulleys to feed-rolls; dotted lines *a' a'*, feed-roll belts.

Having described a portable apparatus such as I use at the brakes where the cane is gathered, and which I drive by horse-power, I will now proceed to explain the manner of operating with it.

The feed-rolls B B and B' B' are made to revolve at a much less speed than the stripping-cylinder C. The cane is spread on the table A, the butt-ends toward the feed-rolls, and pushed forward until taken between the feed-rolls B B, which carry the cane forward under the guide-shield and between the blades of the stripping-cylinder, the branches being flattened down in passing between the feed-rolls, and kept in that position by the guide-shield F. They are caught by the rapidly-moving blades of the stripping-cylinder and broken off close to the stems, which pass on and are received by the second pair of feed-rolls, B' B', which carry them forward and deliver them onto the table H. The revolving blades, thrashing the branches and leaves from the receding stems, deliver them with the entire strippings under the machine.

When the cane is to be used for fishing-poles or weavers' reeds, and it is important that none of it should be split or injured by being crushed by the action of the feed-rolls, they should be made of vulcanized gum-elastic. The operator who feeds in the cane grasps between his hands as much as he can conveniently place on the table, spread and push forward to the feed-rolls. Another operator at the inclined receiving-table drags toward him each bunch as it is delivered from the machine onto the table, placing them in bundles ready for tying of convenient size to be transported. A third operator ties the bundles and removes them. A fourth removes the branches and leaves and attends to the horse-power. I find the inclined table with its stop a great labor-saver in arranging the cane in bundles.

Heretofore cane to be used for fishing-poles, weavers' reeds, &c., has mostly been stripped by hand without the aid of any mechanical device.

Smaller canes are sometimes stripped by drawing or jerking rapidly by the small end through a hole in a plank or plate of iron single stems at a time. Sometimes a sapling is cut off about four feet from the ground and split, a wedge being inserted to keep the split open in the form of a V, through which several stems at a time are rapidly drawn, and the spreading branches coming in contact with the sides of the split are stripped off.

The branches and leaves are more than half the weight of the entire cane when in a green state, and if bundled in that condition, however closely tied, are more than four times the bulk of stripped cane. The leaves without the branches form about one-fourth the weight of the plant, and if removed, leaving the branches on the stems, the bulk is reduced fully one-half.

My use of cane being for fiber for paper-stock, the small branches yield a good short fiber, and are sometimes worth the transportation to the works. In that case I use a machine with the blades set far enough apart to allow the branches to pass through by bending back, in which case the leaves are torn off, leaving the branches. I find in practice that when the cane passes through the machine at the rate of about one hundred feet per minute, and the blades move about twelve hundred feet per minute, all the branches are stripped off; but when the cane moves at a speed of one hundred feet and the blades at from four hundred to five hundred feet per minute the leaves alone are taken off.

From the above description of a machine capable of performing the uses to which I apply it, it is evident that the theory of its operation is snapping off the branches or leaves by the rapid blows struck by the revolving arms, slats, or blades, while the cane is fed onward in such a manner as to present the branches to the blades and at the same time to hold the cane with sufficient firmness to prevent its being jerked forward by the blades, instead of the branches being broken off by them.

It is also evident that the machinery to accomplish this purpose may be made in various ways. For instance, instead of a guide-shield to confine the cane between the blades, two stripping-cylinders may be used, the points of their blades coming together or working into one another, so that either the one or the other set of blades will catch the branches, or the blades of a single cylinder may be made so long that the cane cannot rise from between them when held by the feed-rolls; or, again, slats on two cylinders, arranged as the knives on the common paper-pulp-beating engine, may be made to revolve such a distance apart that the cane may be fed between them, the slats stripping and snapping off the branches; or a stripping-cylinder may be made to revolve in the opposite direction to the feed-rolls. I therefore do not wish to limit myself to the precise arrangement of machinery described, while I obtain the same results by means substantially the same; but What I do claim, and desire to secure by Letters Patent, is—

1. The stripping or breaking of the branches from the stems of cane or reeds, or stripping off the leaves only, by blows struck by revolving arms, slats, or blades, the cane or reeds being so fed as to insure contact with the part to be struck off, substantially as specified.

2. Receiving the stripped cane upon an inclined table, arranged with a stop to facilitate bundling, substantially as specified.

GEO. ESCOL SELLERS.

Witnesses:
LOUIS S. DENNIS,
F. C. DENNIS.